R. E. HELLMUND.
SYSTEM OF CONTROL.
APPLICATION FILED SEPT. 9, 1915.

1,285,161.

Patented Nov. 19, 1918.

WITNESSES:
Fred H. Miller
W. R. Coley

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,285,161.　　Specification of Letters Patent.　　Patented Nov. 19, 1918.

Application filed September 9, 1915. Serial No. 49,753.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control for dynamo-electric machines, and it has special reference to phase-advancing means for regulating the power factors of polyphase induction motors and distributing systems.

One of the objects of my invention is to provide a system of the above-indicated character which shall be simple in arrangement of circuit connections and operation, which shall effectively and reliably function to accomplish its intended result, and which shall be particularly adapted for regulating the power factors of polyphase apparatus which is associated with interconnected polyphase rheostatic controlling devices.

In the prior art, it has been unusual to effect compensations for poor power factors under starting condition when accelerating rheostatic devices were in operation.

According to my present invention, I provide phase-advancing means which shall be particularly adapted to be employed in systems of the character just referred to, and to accomplish the desired ends at all times, whether or not the accelerating rheostatic device is being operated.

Figure 1:
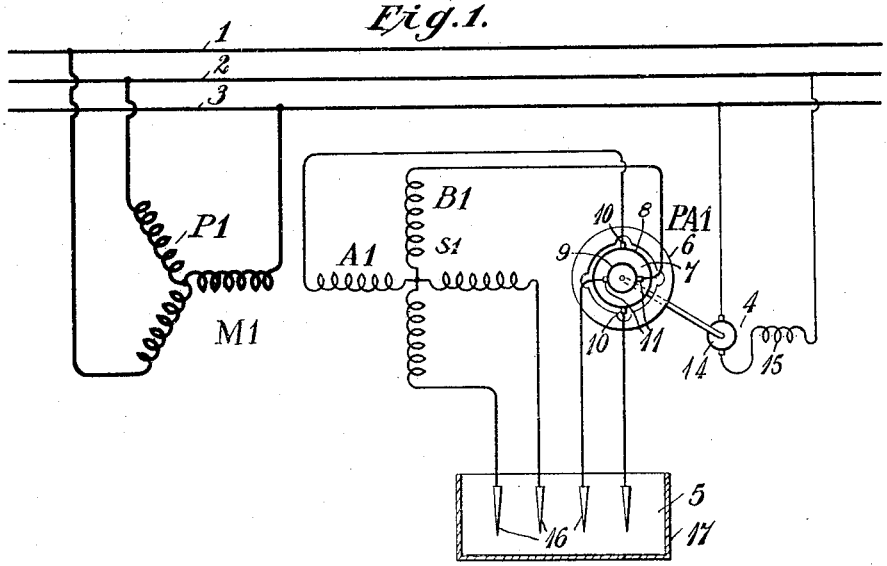
Figure 2:
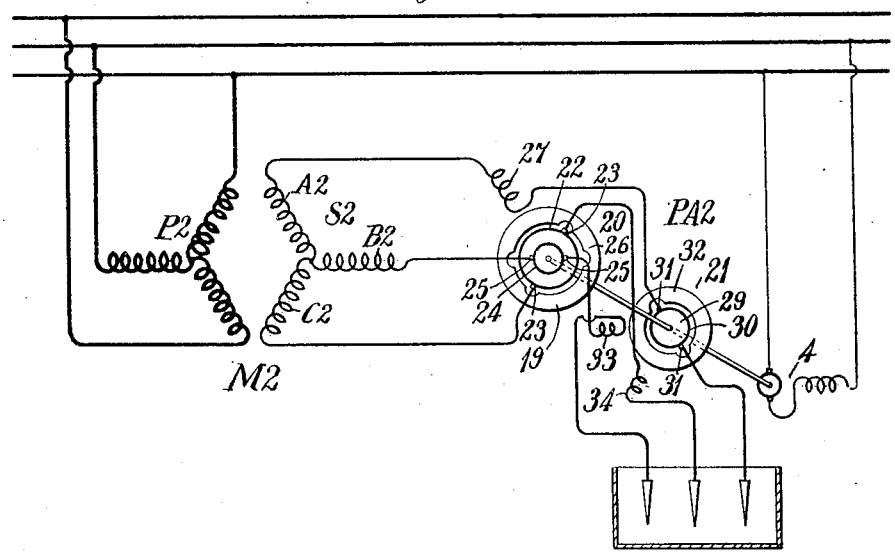

In the accompanying drawing, Figure 1 is a diagrammatic view of a system of control embodying my invention, and Fig. 2 is a similar view of a modified system embodying my invention.

Referring to Fig. 1, the system shown comprises polyphase supply circuits 1, 2 and 3, a polyphase induction motor $M^1$, a phase advancer $PA^1$, a driving motor 4 and a rheostatic device 5.

The supply-circuit conductors 1, 2 and 3 are adapted to deliver three-phase energy to primary windings $P^1$ of the motor $M^1$ which are connected in star relation. The motor $M^1$ comprises secondary windings $S^1$ of the two-phase type.

The phase advancer $PA^1$ is of the general type known as the Leblanc phase advancer and comprises a magnetizable core 6 without windings of any kind and an armature 7 which is provided with separate and independent armature windings that are respectively connected to commutator cylinders 8 and 9, the latter being respectively provided with sets of brushes 10 and 11 that are disposed in 90° relation to each other and are connected in series circuit with the respective phase windings $A^1$ and $B^1$ of the rotor or secondary of the motor $M^1$.

As will be understood by those skilled in the art, the armature winding associated with the set of brushes 10 will have developed therein a voltage in phase with the current of the secondary phase windings $B^1$ by reason of the field that is produced by the armature windings associated with the brushes 11 which are traversed by current supplied by the phase windings $B^1$ of the rotor. Similarly, a voltage is developed in the armature windings associated with the brushes 11 by the current which traverses the other armature windings having connections to the brushes 10, and this voltage is in phase with the current of the secondary phase windings $A^1$ of the rotor.

The phase advancer $PA^1$ is mechanically associated with an armature 14 of the driving motor 4 which is also provided with a field-magnet winding 15 that is connected in series relation with the armature across the supply-circuit conductors 2 and 3. Any suitable form of driving unit may be employed.

The polyphase rheostatic device 5 comprises a liquid rheostat embodying a plurality of electrodes 16 that are adapted for immersion in electrolyte within a single containing tank 17. In its broadest aspect, any form of rheostatic device may be employed, but, more specifically, the rheostatic device is of the interconnected polyphase type, such as a liquid rheostat of the form illustrated or a plurality of star-connected adjustable resistors.

With a rheostatic device of the character set forth, it would be difficult to employ a phase advancer of the usual class at the same time that the rheostat was performing its function. However, by means of the phase-advancer and system described, it is possible to secure the benefits of power-factor compensations during acceleration when the rheostatic device is used, as well as after full-speed conditions have been attained and the rheostatic device removed from the circuit.

Reference may now be had to Fig. 2, in which the polyphase motor $M^2$ embodies star-connected primary windings $P^2$ and secondary windings $S^2$ comprising separate phase windings $A^2$, $B^2$ and $C^2$. In order to effect power-factor corrections when a three-phase secondary winding is employed, I provide phase advancing means $PA^2$ which embodies a plurality of dynamo-electric machines 20 and 21 that are mechanically connected to the driving motor 4 and are operated thereby.

The machine 20 embodies an armature winding that is connected to a commutator cylinder 22 which is provided with a set of brushes 23 and also a separate and independent armature winding that is associated with a commutator cylinder 24 having a set of brushes 25 coöperating therewith. The machine 20 is also provided with a magnetizable field-magnet structure 26 having a single exciting winding 27 that is traversed by the current from phase $A^2$ of the secondary windings $S^2$ and is, therefore, excited in phase therewith. The armature winding connected to the brushes 23 is traversed by the current from phase $C^2$, while phase $B^2$ is connected to the set of brushes 25 whereby the associated armature winding is traversed by the current from the phase winding $B^2$, as will be understood.

The other machine 21 embodies a single armature 29 having a single armature winding that is connected to a commutator cylinder 30 having a set of brushes 31 coöperating therewith, and said armature winding is connected in series-circuit relation with the field-magnet winding 27 of the machine 20 and is traversed by the current from the phase winding $A^2$. A field magnet structure 32 is provided with a plurality of field-magnet windings 33 and 34 which are respectively connected in series circuit with the armature windings that are associated with the brushes 25 and 23 of the machine 20 and are thus excited in phase with the respective secondary phase windings $B^2$ and $C^2$ of the motor rotor.

By reason of the peculiar arrangement of circuit connections and brushes, a phase-correcting voltage is introduced into phase $B^2$ of the secondary windings $S^2$ by means of the armature winding which is associated with the brushes 25 and induces a voltage therein in quadrature to the voltage of the phase winding $B^2$ by reason of the resultant field produced by the exciting winding 27 and the armature winding which is associated with the brushes 23, as will be understood. Similarly, a phase-correcting voltage of the proper phase position is induced in the armature winding that is associated with the brushes 23 by the combined effect of the fields that are produced by the exciting field-magnet winding 27 and the armature winding that is associated with the brushes 25.

In order to effect a similar compensation for the voltage in phase $A^2$, the machine 21 is employed and, by reason of the exciting windings 33 and 34 that are respectively connected in phase with the windings $B^2$ and $C^2$ of the secondary windings $S^2$, the proper resultant correcting voltage is induced in the armature winding that is associated with the brushes 31 thereof, as will be understood.

Hence, power-factor corrections for polyphase machines having three-phase secondary windings are effected, while permitting the employment of an interconnected polyphase rheostatic governing device.

Obviously, modifications in the circuit connections, arrangement and location of parts and mode of operation may be effected without departing from the spirit and scope of my invention. I desire, therefore, that only such limitations shall be imposed as are indicated in the appended claims.

I claim as my invention:

1. In a control system, the combination with a polyphase induction motor having primary and secondary windings, of a polyphase regulating rheostat connected to said secondary windings, and phase-advancing means embodying an armature having a plurality of separate windings respectively connected in circuit with separate secondary phase windings of said induction motor, between said motor and said rheostat.

2. In a control system, the combination with a polyphase induction motor having primary and secondary windings, of a polyphase regulating rheostat connected to said secondary windings, and dynamo-electric phase-advancing means embodying an armature, a plurality of separate armature windings and separate commutator cylinders connected thereto, said separate phase-advancing windings being respectively connected in circuit with separate secondary phase windings of said induction motor, between said motor and said rheostat.

3. In a control system, the combination with a polyphase induction motor having primary and secondary windings, and interconnected polyphase rheostatic means for governing the operation of said induction motor, of phase-advancing means embodying a single armature, and a plurality of separate windings therefor respectively connected in circuit with separate secondary phase windings of said motor and said interconnected rheostatic means.

4. In a control system, the combination with a polyphase induction motor having primary and secondary windings, and a polyphase interconnected rheostatic device for governing the operation of said induction motor, of dynamo-electric phase-advancing means embodying an armature having a plurality of separate windings respectively connected in series circuit between separate secondary phase windings of said induction motor and the rheostatic device.

5. In a system of control, the combination with a three-phase induction motor having three-phase primary and secondary windings, of phase-advancing means associated with the secondary windings and comprising a plurality of dynamo-electric machines, one of which embodies a plurality of separate armature windings.

6. In a system of control, the combination with a three-phase induction motor having three-phase primary and secondary windings, of phase-advancing means associated with the secondary windings and comprising a plurality of dynamo-electric machines respectively embodying a pair of separate armature windings and a single armature winding.

7. In a system of control, the combination with a three-phase induction motor having three-phase primary and secondary windings, of phase-advancing means associated with the secondary windings and comprising a plurality of dynamo-electric machines, one of which embodies separate armature windings and a single exciting winding severally connected in circuit with the respective secondary phase windings and the other of which embodies a single armature winding and a pair of exciting windings severally connected in circuit with the respective secondary phase windings.

8. Phase-corrective means for a three-phase system comprising a dynamo machine of the commutator type having two sets of brushes disposed in commutating planes substantially 120° apart, connections from two phases of said system through said brush sets respectively, a stator winding connected in the remaining phase and so mounted that its axis substantially bisects said 120° angle, whereby the rotor field produced by one brush set combines with the field of said stator winding to produce a quadrature related field for the production of a corrective E. M. F. in the remaining phase and vice versa, an additional dynamo-electric machine of the commutator type provided with a single pair of brushes connected in circuit with said stator winding exciting phase and provided with two stator windings disposed at equal angles on each side of a plane perpendicular to the plane of commutation of said single brush set connections from said stator windings to the rotor exciting phases of said first named machine, whereby a quadrature related field is produced in said second machine for the generation of a quadrature related corrective E. M. F. in said stator exciting phase of said first named machine, and driving means for said two dynamo-electric machines.

In testimony whereof I have hereunto subscribed my name this 31st day of Aug., 1915.

RUDOLF E. HELLMUND.

Copies of this patent may be obtained for five cents each, by addressing the "Commissioner of Patents, Washington, D. C."